B. M. BESKOW.
ELECTRIC TOASTER.
APPLICATION FILED OCT. 7, 1919.
1,332,879.
Patented Mar. 9, 1920.
2 SHEETS—SHEET 2.
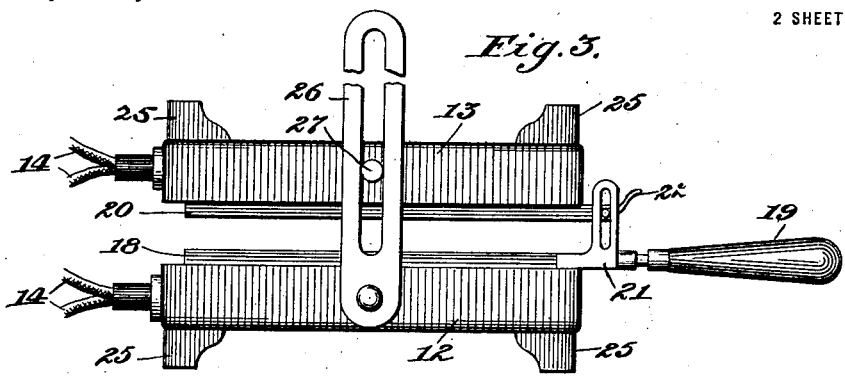
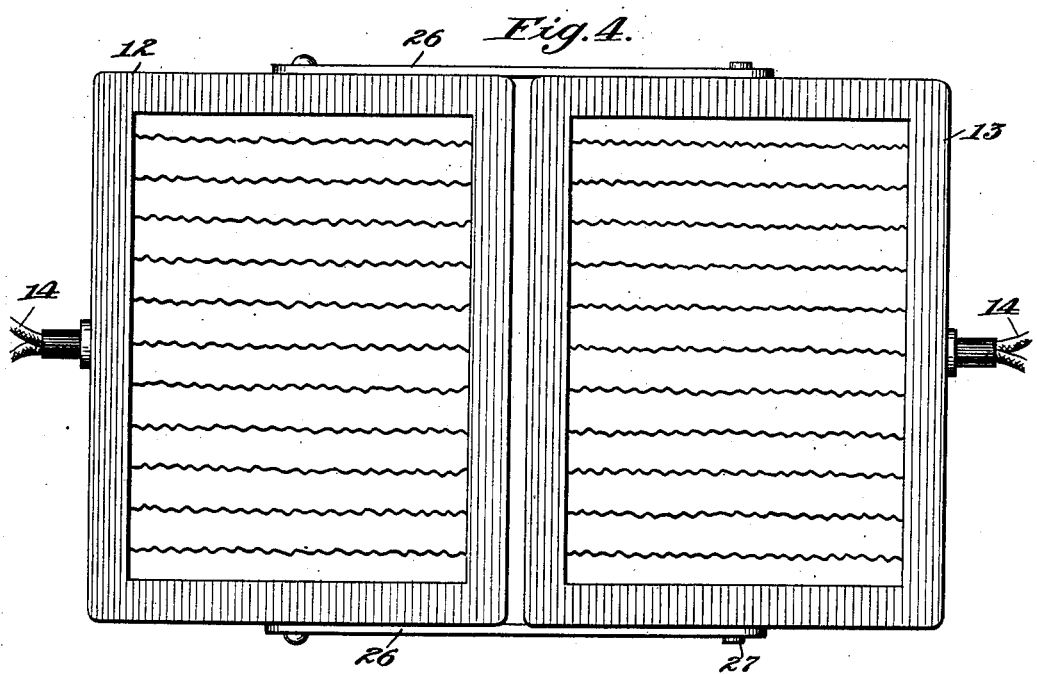
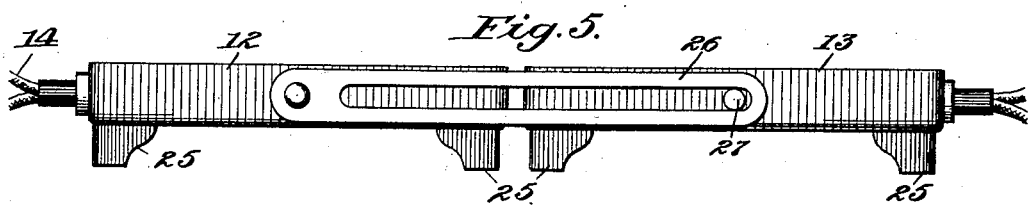
Inventor:
Bernhard M. Beskow,
by Calvert Calvert,
Att'ys.

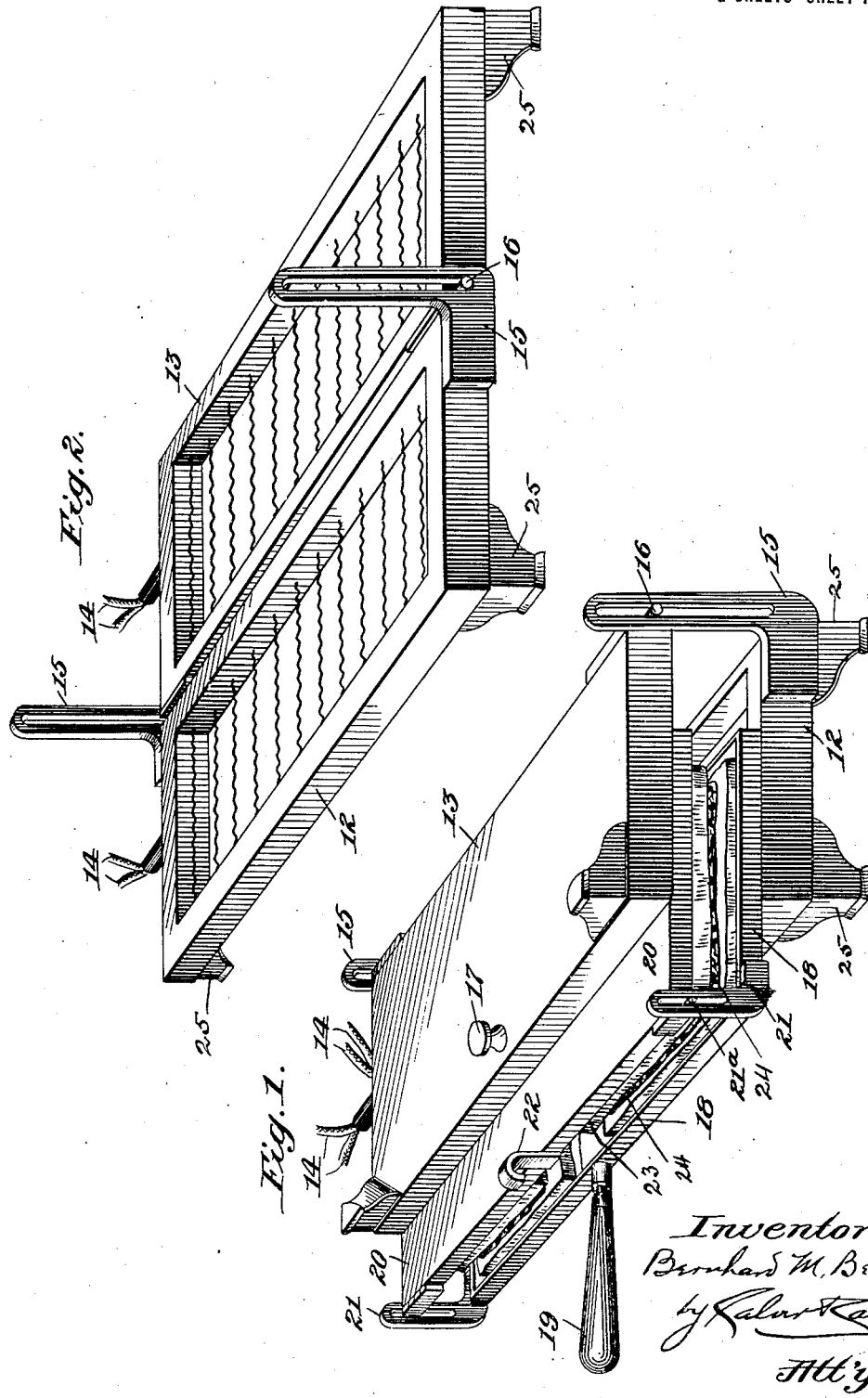

UNITED STATES PATENT OFFICE.

BERNHARD M. BESKOW, OF LAKE GEORGE, NEW YORK.

ELECTRIC TOASTER.

1,332,879.  Specification of Letters Patent.  Patented Mar. 9, 1920.

Application filed October 7, 1919. Serial No. 329,147.

*To all whom it may concern:*

Be it known that I, BERNHARD M. BESKOW, a citizen of the United States, residing at Lake George, in the county of Warren and State of New York, have invented or discovered certain new and useful Improvements in Electric Toasters, of which the following is a specification, reference being had therein to the accompanying drawings.

This invention has for its object to provide an electric toasting or broiling device comprising two members to be heated by an electric current and which members are loosely connected with each other so that the toasting or broiling parts may automatically adjust themselves so that they may be in contact with both sides of articles of different thicknesses, the improved toasting or broiling device being of such construction that it may also be used as an electric cooking stove. To this end the heating members and the toasting or broiling members, heated by an electric current, are loosely joined together in such a manner that they may recede from or approach each other according to the thickness of the article to be toasted or broiled, these heating members and also the toasting or broiling members being so joined together that they may remain parallel in different positions of adjustment, as will hereinafter more fully appear.

In the accompanying drawing Figure 1 is a perspective view of an electric heater, embodying one form of the present invention, with the parts in toasting or broiling position. Fig. 2 is a perspective view of the same showing the heating members opened out so as to serve as a cooking stove. Figs. 3, 4 and 5 illustrate another form of the invention.

Referring to the drawings, 12 and 13 denote electric heating members which may be internally of any well known or suitable construction, and which are provided with conductors 14 connected to any suitable source of electric current which passes from one member to the other. In the form of the invention shown in Figs. 1 and 2 the members 12 and 13 have loose hinged connections with each other by means of slotted brackets 15, mounted on the lower member 12 and entered by pintle pins 16 attached to the upper member 13 which latter is provided with a knob 17 by which it may be lifted for the purpose of removing or inserting the articles to be toasted or broiled. Resting on the member 12 is a metal pan 18 preferably provided with a handle 19, by which it may be carried, and loosely connected with said pan 18 is a similar pan 20 which is inverted and on which rests the upper heating member 13. The pans 18 and 20 are loosely connected together by means of slotted brackets 21 attached to the pan 18 at the side of the toaster opposite the brackets 15, engaged by pintle pins 21ª attached to the upper pan 20, said pan 20 being preferably provided with a handle 22 which may be pressed upon outwardly to lift the said pan 20 on its hinge when an article to be toasted or broiled is to be inserted between the two pans.

The slotted brackets and pintle pins joining the heating members 12 and 13, as also the slotted brackets and pintle pins joining the toasting or broiling members 18 and 20 afford loose hinged or pivoted connections between these members so that they may remain parallel as they automatically adjust themselves to different thicknesses placed between them.

From the foregoing it will be understood that the toasting or broiling pans 18 and 20, electrically heated from the members 12 and 13, are adapted to be in contact with both sides of articles of different thicknesses to be toasted or broiled, in that the toasting members are so connected and arranged that they may be close together or may be considerably separated. As shown in Fig. 1 the lower of two slices 23 of bread rests in the lower toasting pan 18 while the upper toasting pan 20, on which the heating member 13 rests, is in contact with the upper slice of bread, these slices of bread being supposedly separated by a slice of cheese 24, so that a toasted cheese sandwich, which may be of any desired thickness, may thus be quickly and readily made. In Fig. 1 the toasting or broiling members are shown as being partly drawn outward from the heating members, for clearness of illustration.

The heating members 12 and 13 are both preferably provided with short supports or legs 25 of equal length, or substantially so, and thus when the device is to be used as a cooking or heating stove the upper member 13 may be turned outward on its hinged connection with the lower member 12, as shown in Fig. 2, and will then rest on its legs 25, thus affording an extended heating surface on which cooking utensils may be placed.

In the form of the invention shown in Figs. 3, 4 and 5 the heating members 12 and 13 are connected together by slotted links 26 pivoted to the lower member 12, the slots of said links being entered by pins 27 on the upper members 13. This construction permits the same parallel adjustment of the heating members from and toward each other as is afforded by the construction shown in Figs. 1 and 2 and also permits the upper heating member to be turned down, as shown in Figs. 4 and 5, when the device is to be used as an electric cooking stove.

Having thus described my invention I claim and desire to secure by Letters Patent:

1. An electric toasting or broiling device comprising two electric heating members having loose connections with each other, in combination with two toasting or broiling members which also have loose connections with each other and which are heated from said heating members, said heating members being both provided with supports or legs to adapt the device for use in an electric stove.

2. An electric toasting or broiling device comprising two electrically heating members one of which is provided with slotted brackets and the other of which is provided with pintle pins entering the slots of said brackets.

3. An electric toasting or broiling device comprising two electrically heating members one of which is provided with slotted brackets and the other of which is provided with pintle pins entering the slots of said brackets, in combination with two toasting or broiling members one of which is also provided with slotted brackets and the other of which is provided with pintle pins engaging the slots of said brackets, the brackets and the pintle pins of said toasting or broiling members being on the opposite side of the device from the brackets and pintle pins of said heating members.

4. An electric toasting or broiling device comprising two electrically heating members one of which is provided with slotted connecting parts and the other of which is provided with pins entering the slots of said slotted parts, said heating members being both provided with supports or legs to adapt the device for use as an electric stove.

5. An electric toasting or broiling device comprising two electrically heating members one of which is provided with slotted brackets and the other of which is provided with pintle pins entering the slots of said brackets, said heating members being both provided with supports or legs to adapt the device for use as an electric stove.

6. An electric toasting or broiling device comprising two electrically heating members one of which is provided with slotted brackets and the other of which is provided with pintle pins entering the slots of said brackets, in combination with two toasting or broiling members one of which is also provided with slotted brackets and the other of which is provided with pintle pins engaging the slots of said brackets, the brackets and the pintle pins of said toasting or broiling members being on the opposite side of the device from the brackets and pintle pins of said heating members, said heating members being provided with supports or legs to adapt the device for use as an electric stove.

7. An electric toasting or broiling device comprising toasting or broiling members having loose sliding connections with each other so that they may move toward and from each other while remaining parallel and in the same vertical plane, and may thus automatically adjust themselves to articles of different thicknesses placed between them to be toasted or broiled.

8. An electric toasting or broiling device comprising two heating members and two toasting or broiling members, all of said members having loose sliding connections with each other so that they may move toward and from each other while remaining parallel and in the same vertical plane, and may thus automatically adjust themselves to articles of different thicknesses placed between them.

9. An electric toasting or broiling device comprising two heating members having loose sliding connections with each other so that they may move toward and from each other while remaining parallel and in the same vertical plane, and may thus automatically adjust themselves to articles of different thicknesses placed between them.

In testimony whereof I affix my signature.

BERNHARD M. BESKOW.